Aug. 23, 1966   C. GOODACRE   3,268,033
LOAD-HANDLING APPARATUS SUCH AS PALLET-LIFTING TRUCKS
Filed Jan. 9, 1964   6 Sheets-Sheet 2
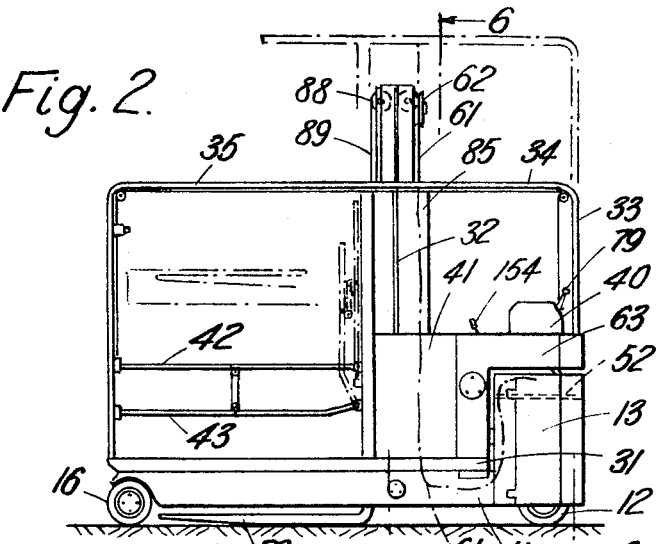
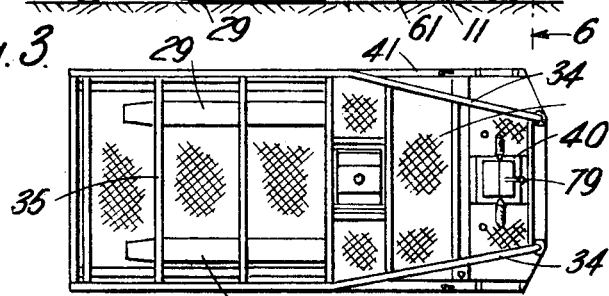
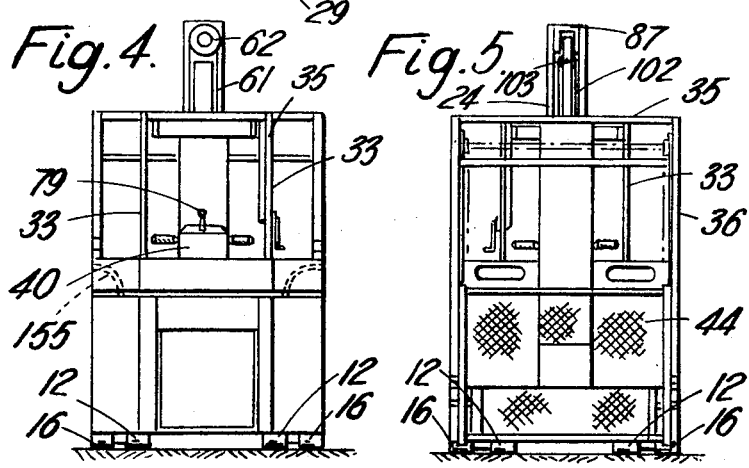

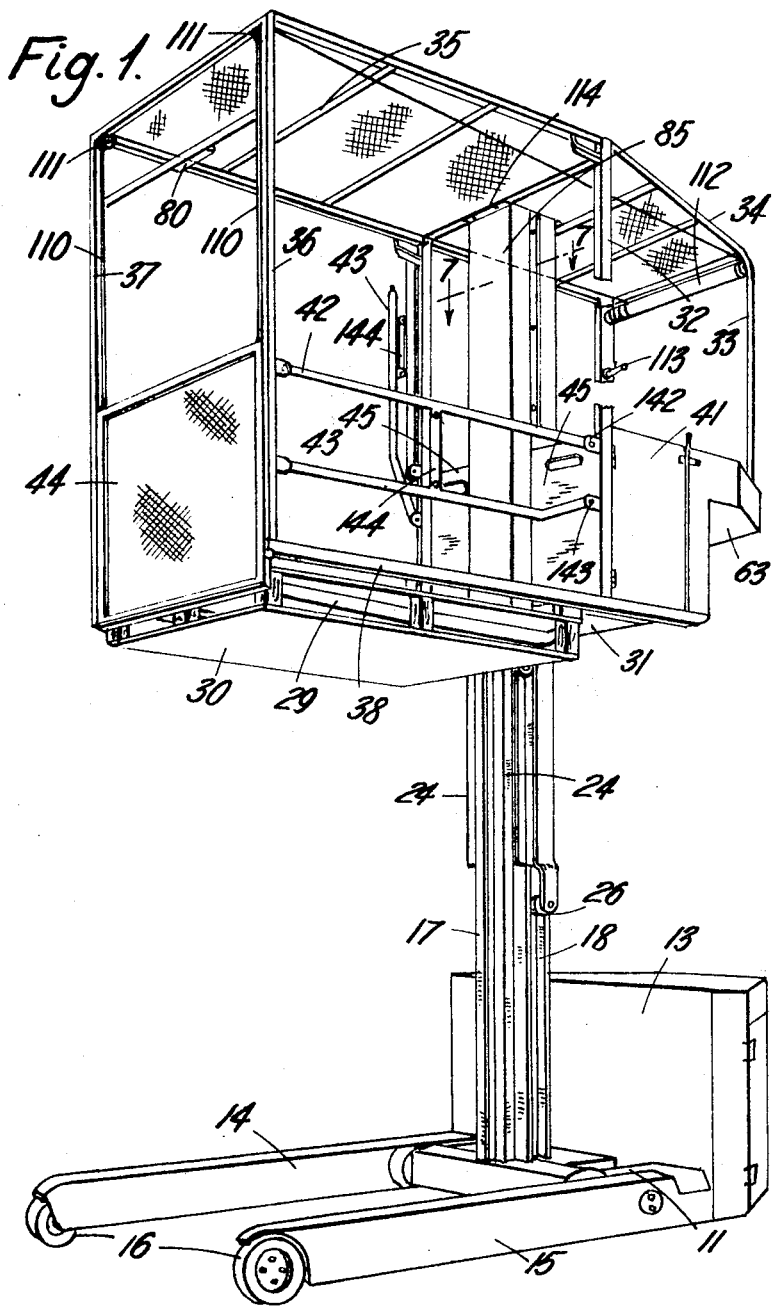

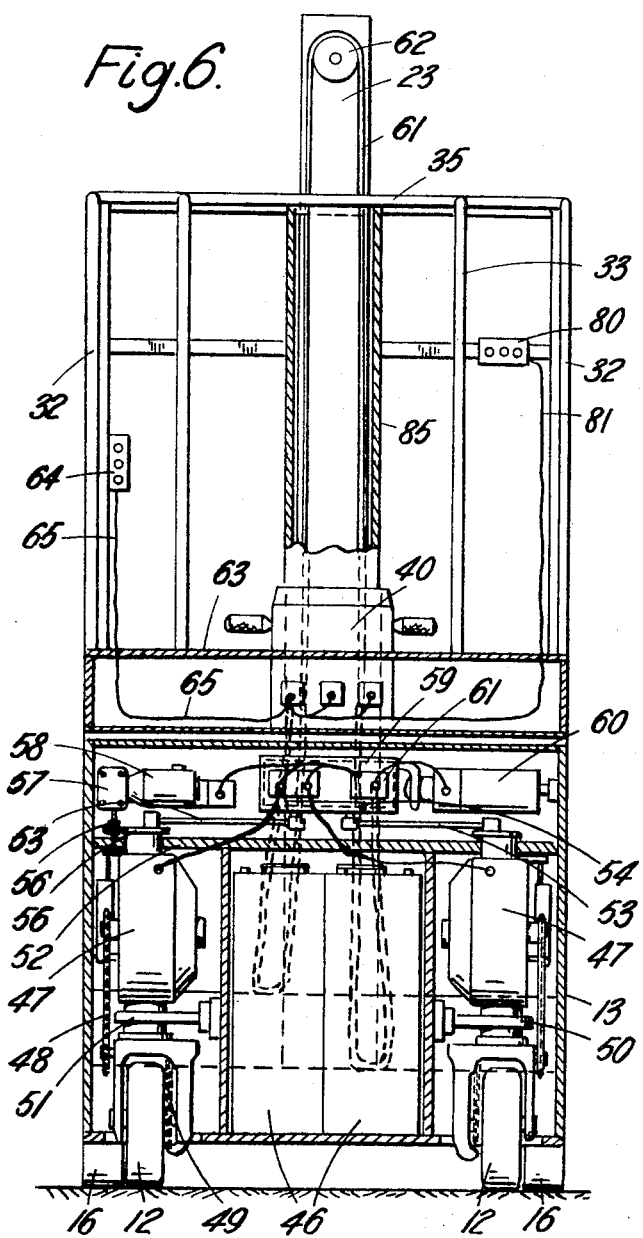

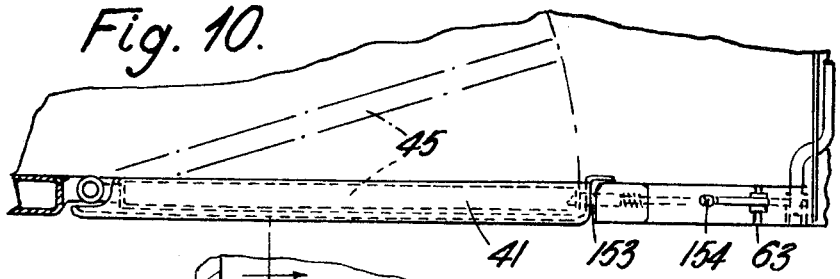
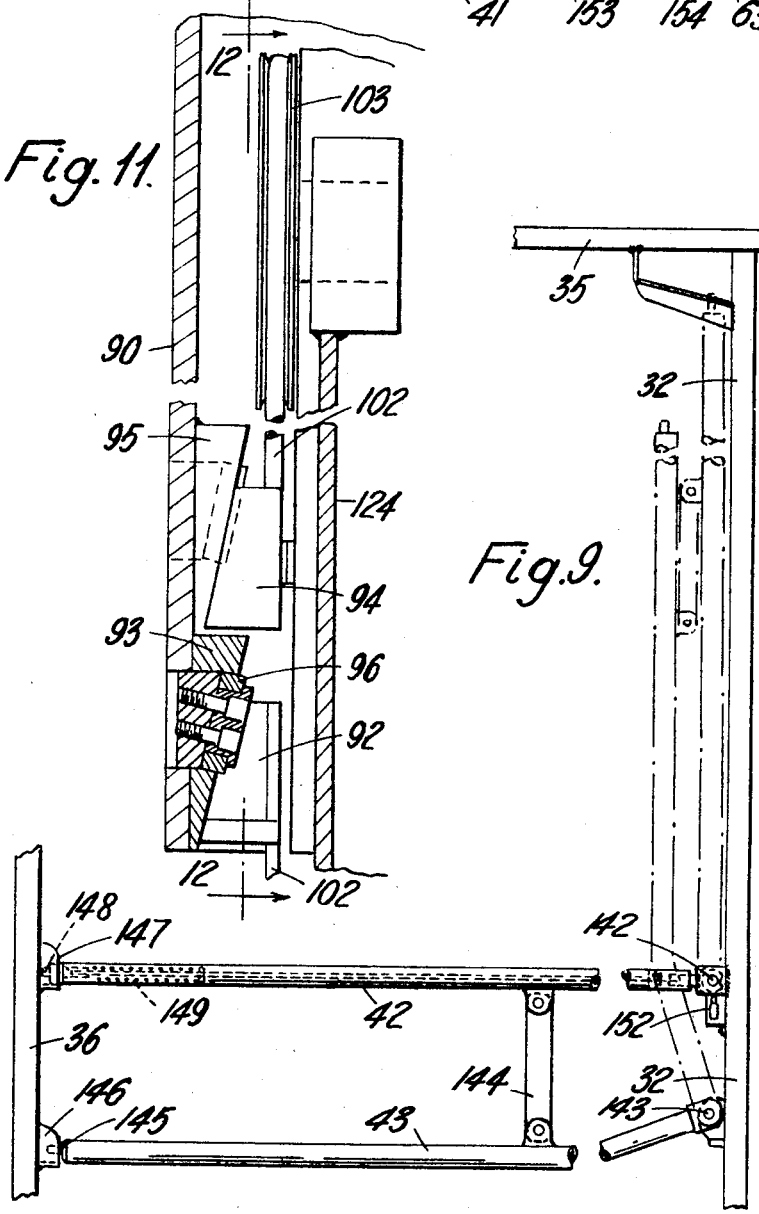

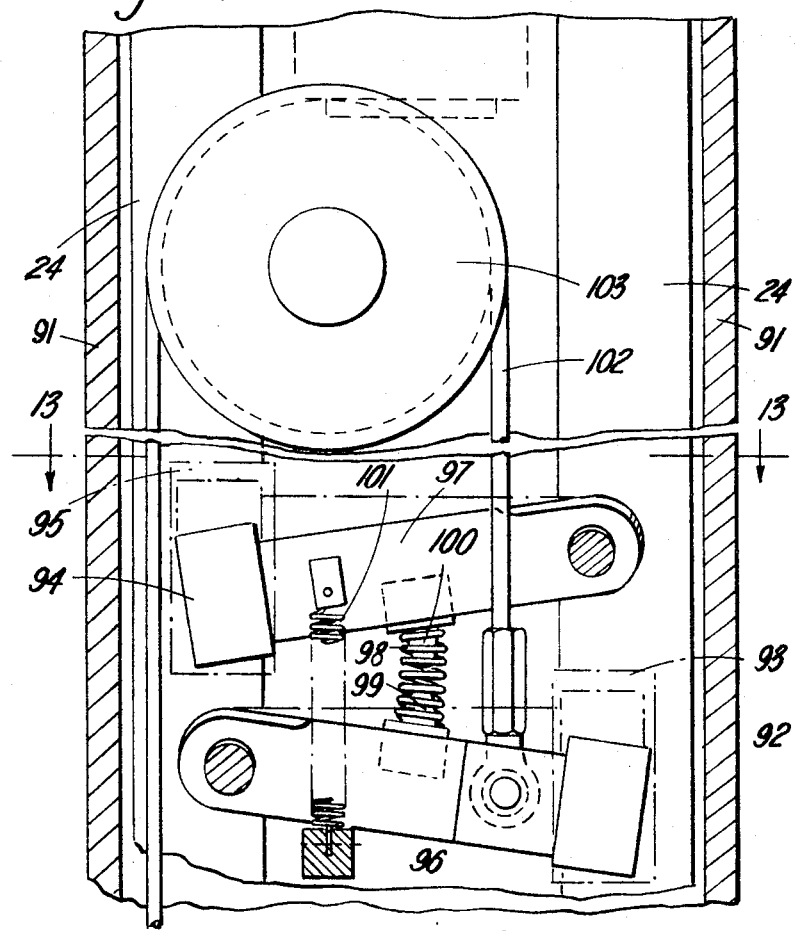
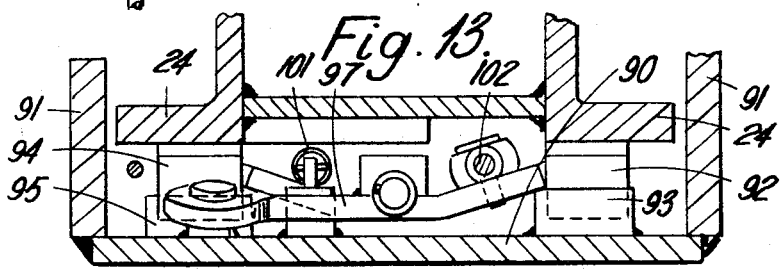

United States Patent Office 3,268,033
Patented August 23, 1966

3,268,033
LOAD-HANDLING APPARATUS SUCH AS
PALLET-LIFTING TRUCKS
Cecil Goodacre, Basingstoke, England, assignor to
Lansing Bagnall Limited, Basingstoke, England, a
British company
Filed Jan. 9, 1964, Ser. No. 336,719
Claims priority, application Great Britain, Jan. 11, 1963,
1,372/63; Aug. 6, 1963, 31,054/63
11 Claims. (Cl. 187—9)

This invention comprises improvements in or relating to load-handling apparatus such as pallet lifting trucks.

It is one object of the invention to provide a pallet-lifting truck which can be used in a store in such a manner as to enable the operator easily to select goods from the store and load them on to the pallet.

It is a further object of the invention to provide a safety device for use in conjunction with a pallet lifting truck of the kind in which there is an operator-platform which rises and falls with the load.

According to one feature of the present invention a truck has in combination a wheeled body, a mast upstanding from the body which is narrow in relation to the width of the body, a carriage movable up and down the mast, an operator-platform on the carriage extending lengthwise of the body from the mast in one direction, pallet-supporting means on the carriage extending in the opposite direction, a guard surrounding the pallet-supporting means and, between the guard structure and the mast at least one opening to enable the operator to step beside the mast from the platform on to a pallet supported within the guard. While on the pallet the operator can raise the carriage to the level of goods stored in shelving on either side of him and he can reach over the guard and load them on to or off the pallet, and he can retire to the platform, where truck controls are mounted, to move the truck as desired. The mast, being narrow, permits easy passage to the sides of the pallet, whereas a mast of the more usual type comprising two uprights spaced apart at the sides of the truck must be braced by cross-members which would not allow passage through the centre of the mast to reach the pallet, as the cross-members would obstruct movement of the operator when the platform is rasied to within about five feet of the cross-members. When working according to this invention the centre of the pallet is loaded, leaving the sides free, which allows the operator to lean over the side to select goods from store.

According to a further feature of the invention there is provided in load handling apparatus having an upwardly-extending mast or guide and a load carriage including an operator-platform which runs up and down on the mast or guide and supporting means for the load carriage which includes a chain or cable connected to the carriage for raising and lowering it on the guide, a safety device for restraining downward movement of the carriage relative to the guide in the event of the said chain or cable breaking, which safety device comprises first and second wedge members which are mounted on the carriage for relative movement with respect to one another and which are movable relative to each other between a first position in which the wedge members permit free movement of the carriage along the guide and a second position in which the wedge members restrain the carriage against downward movement along the guide, and means adapted to cause relative movement of the wedge members from said first position to said second position in the event of breakage of the supporting means.

In one arrangement, one of the wedge members is fixed to the load carriage and the other wedge member is movable upwardly and downwardly relative thereto to bring the wedge members into the first and second relative positions. The said other wedge member may for instance be mounted on an arm pivoted to the load carriage.

The means for causing relative movement between the wedge members may conveniently comprise a chain or cable which is additional to the first said chain or cable and is arranged to move therewith during raising and lowering of the carriage.

In the arrangement where one of the wedge members is fixed, the additional chain or cable is connected to the other wedge member.

Further features of the invention will be apparent from the following which is a description, by way of example, of one construction according to the invention.

In the accompanying drawings:

FIGURE 1 is a perspective view of a truck according to the invention showing an operator platform and load-lifting devices in the elevated position;

FIGURE 2 is a side elevation of the same with the operator-platform and load-lifting devices in the lowered position;

FIGURE 3 is a plan of the truck shown in FIGURE 2;

FIGURE 4 is a rear elevation of the same;

FIGURE 5 is a front elevation;

FIGURE 6 is a vertical section on the line 6—6 of FIGURE 2 looking in the direction of the arrows;

FIGURE 9 is a side elevation of a safety gate;

FIGURE 10 is a plan of another gate on the operator-platform;

FIGURE 11 is a vertical section through a part of the mast showing part of a safety device for the carriage which carries the operator-platform;

FIGURE 12 is a section upon the line 12—12 of FIGURE 11 looking in the direction of the arrows; and FIGURE 13 is a horizontal section upon the line 13—13 of FIGURE 12 looking in the direction of the arrows.

Figure 7:
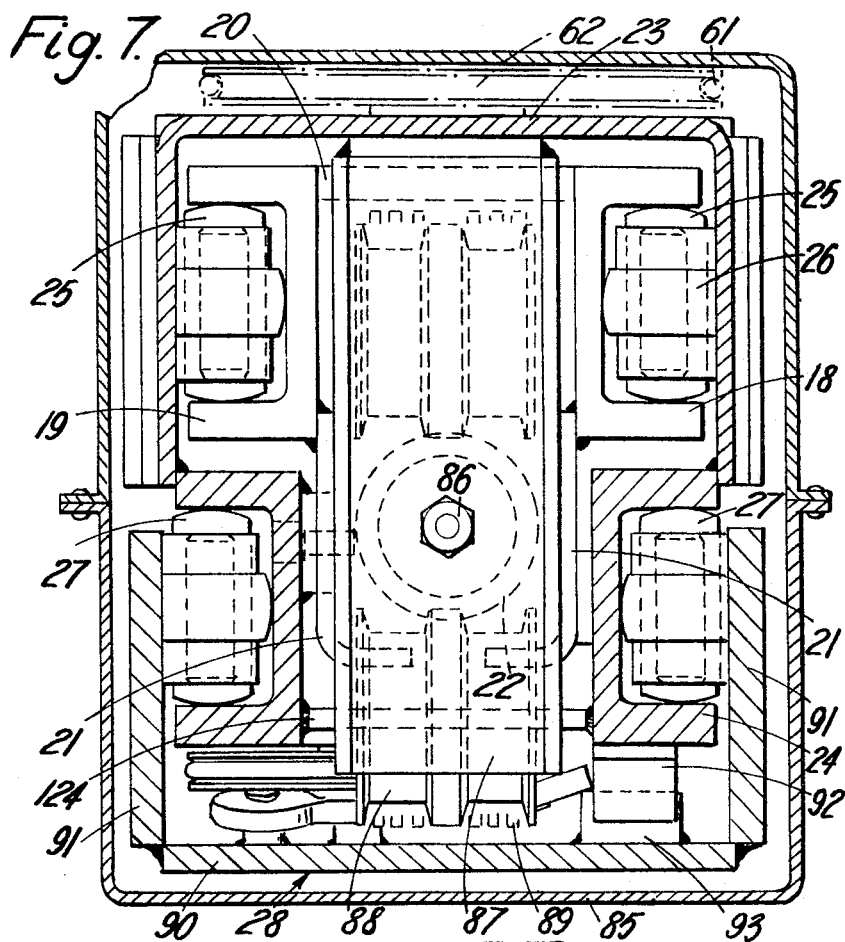
FIGURE 7 is a plan upon the line 7—7 of FIGURE 1 to an enlarged scale showing a section of the mast.

Referring to FIGURES 1 to 5 the truck has a flat body 11 close to floor level, which is provided with driving and steering wheels 12 at one end, the mechanism for operating which is enclosed in a box-like structure 13 which stands up at one end of the body. At the other end are two straddle legs 14, 15 which are supported by ground wheels 16.

At the part of the body 11 where the straddle legs 14, 15 begin there is a vertical rigid mast 17. This mast is in contrast with the usual masts of pallet trucks in as much as it is scarcely any wider than it is deep from front to back and it consists of two heavy channel-sectioned sides 18, 19 erected back-to-back, that is to say, with their flanges facing outwards, and united by a heavy plate 20 (FIGURE 7) extending between them and welded to them at each edge. The plate 20 is at the far side of the mast as viewed in FIGURE 1. At their front flanges, that is the flanges which are nearest to the beholder as viewed in FIGURE 1, there is welded to each channel member an angle member 21, one flange of the angle-shaped member being turned inward toward the corresponding flange of the other. The result is a box-shaped space between the channel members of the mast which is however open down the front side of the mast, that is the side nearest to the beholder in FIGURE 1, and this box-shaped section contains a ram for raising and lowering the mast and chain gear connected to the ram. The cylinder of the ram is shown in dotted lines at 22 in FIGURE 7.

On the fixed mast members 18, 19 there runs a rising mast which consists of a plate 23 bent into channel-shape and large enough to enclose the channel members 18, 19 of the fixed mast between its two flanges. At the front edge of each of the flanges of the channel-shaped rising masts 23 there is welded a channel member 24 and the two channel members 24 have their flanges facing outwardly. The channels 24 are further connected by a plate 124 welded to the back of each channel near the front of the mast. To the interior of the plate 23 of the rising mast there are welded mountings for rollers 25 which run between the flanges of the channel members 18, 19 of the fixed mast. There are also other rollers 26 to bear on the backs of the channel members 18, 19.

In the channel members 24 of the rising mast there run rollers 27 which are mounted on a U-shaped plate 28 which forms a rising carriage running on the rising mast and serving to carry fork arms 29 projecting in the same direction as the straddle legs 14, 15 and narrow enough to be lowered between the straddle legs. On the fork arms there may be mounted a pallet 30 shown clearly in FIGURE 1. The pallet 30 is capable of being rested on the ground and the truck withdrawn from it, or when it is desired to pick up a pallet the fork arms 29 are lowered to the ground level as shown in FIGURE 2 and the truck can then be run forward with the straddle legs 14, 15 on each side of the pallet until they are engaged fully therewith.

On the carriage 28 there is also an operator-platform 31 which extends toward the other side of the mast from the forks 29 and when the pallet 30 is in place it forms a continuation beyond the mast of the operator-platform 31. It will be understood that the operator-platform extends around the mast, the narrowness of the mast permitting this, and allowing easy passage to the sides of the pallet, whereas a mast of more usual type would necessitate passage through the centre of the mast to reach the pallet and this movement would normally be obstructed by cross-members bracing the side uprights when the platform reached a higher level. Truck controls are mounted in a control box 40 on the platform 31 and the operator can retire to the platform whenever he desires to move the truck.

The platform 31 is framed round with posts 32, 33 and a roof 34 which form a cab. In the other direction above the pallet 30 the roof is extended as shown at 35 and there are side posts 36, 37 which are supported by a bottom frame member 38. The platform 31 is shaped to fit between the mast 17 and the box-like structure 13 which contains the driving and steering gear and the control box 40 is located above the structure 13.

Hinged to the cab on each side are safety gates 41, the detail of which is seen in FIGURE 10, and along each side of the framework which encloses the pallet there are rails 42, 43. Across the front of the pallet space is a gate 44 which can slide up and down on the uprights 36, 37 which are provided with guides for the purpose. In additional, between the uprights 32 of the cab on each side of the mast there are hinged gates 45 which are arranged to fit within the gates 41 in their open position but which can be closed to shut off the platform 31 from the space under the roof 35 around the forks 29 whenever there is no pallet, such as the pallet 30, resting on the forks.

Referring now to FIGURE 6, this shows the interior of the front portion of the truck and the upper portion also shows a vertical section through a box on the carriage, which encloses the mast. The way in which the electrical connections are taken from the controls on the operator-platform to the apparatus in the body part 13 of the truck is also seen in this figure.

It will be seen that within the casing 13 there is a compartment for storage batteries 46 on each side of which are turntable mountings for the driving wheels 12. These mountings comprise electric motors 47 which are connected by reduction gears, including chains 48, 49, to the driving wheels. These turntable mountings are such as are described in our British patent specification No. 780,487 and they rotate in bearings in brackets 50, 51 just above the wheel forks and in a plate 52 which spans the interior of the casing above the motors 47. Above the plate 52 each turntable mounting carries a steering arm which is connected by a track rod 53 to an intermediate triangular lever 54, pivoted on the top plate 52. One of the steering arms 55 which is connected to one of the track rods 53 carries also a toothed segment which meshes with a pinion 56 on a spindle extending from a gear box 57 which is driven by a reversible electric motor 58. The space in the casing above the plate 52 also contains a switch-box 59 and a hydraulic pump 60. The switch-box 59 contains electromagnetic switches controlling resistances in circuit with the electric motors 47 and 58, and the pump 60 is connected to the hydraulic lifting ram cylinder 22 which raises and lowers the mast. Furthermore, there are other controls, including means for applying brakes to the driving gear of the wheels 12 which are controlled from the switch-box 59 and the details of which are known per se and therefore need not be herein described in detail. From the switch-box 59 there extends a cable 61. This cable is led down through the back of the casing 13, as can be seen by the chain line 61 in FIGURE 2, to the base of the mast 17 and then up within the mast as shown in FIGURE 6 and over a pulley 62 at the top of the rising section of the mast and thence down beneath the floor of the operator-platform 31 and up into the box-like casing 63 which extends over the top of the casing 13 and carries the control box 40. There is also a connection, by a route which is not shown in detail in the drawings, from a push button box 64 on one of the side columns 32 of the cab to the cable 61 and thence to the pump motor 60.

Figure 8:
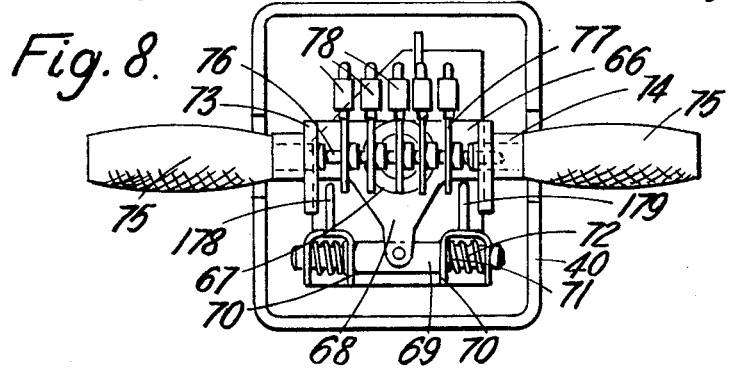
FIGURE 8 is a plan of a control box on the operator-platform with the cover removed.

The control box 40 is shown in FIGURE 8 in plan with its cover removed and it contains a mounting for a steering arm 66 which can rotate about a vertical axis centred on the pivot 67 seen in FIGURE 8. The steering arm has a branch 68 connected to a push rod 69 which slides through brackets 70 on each side of it. The push rod has shoulders 71 which are engaged by centering springs 72 and therefore the steering arm 66 is automatically centred if the operator exerts no force upon it. The steering arm consists of a flat member with its ends turned up to form brackets 73 in which are journaled the shanks 74 of steering handles 75. The handles can rotate about their own axes in the brackets and they are connected together by a spindle 76 which carries a series of cams 77. The cams engage with a series of micro-switches 78 which are connected to the electromagnetic switches in the control box 59 by suitable wiring in the cable 61 so that the speed of the motors 47 can be regulated. Two further micro-switches 178, 179 are operated when the steering arm 66 is rotated about the pivot 67 to left or right and this has for its effect through the connections in the cable 61 to rotate the steering motor 58 in one direction or the other and so bring about steering movements of the wheels 12. When the operator finds that the wheels have been rotated sufficiently he centres the steering arm again and thus regulates the degree of the steering movement. If the operator twists the grips 75 and thus rotates the spindle 76 in one direction or the other, the mirco-switches 78 are operated in sequence by their corresponding cams to start the motors 47 and also regulate their speed. A reversing switch 79 (FIGURES 2 and 3) is provided on the control box to determine the direction of movement of the truck. The push buttons in the box 64 are connected via the cable 61 to the motor of the pump 60 and to a pair of solenoid-operated valves which control the cylinder 22 to lift and lower the platform respectively. In addition there is another switch-box 80 on a cross-member between the uprights 36, 37 which is connected by wiring 81 into the cable 61 and thence to the pump motor and solenoid-operated hydraulic valves which also control the ram cylinder 22 for the raising, stopping or lowering of the mast. It will thus be seen that the operator is able to control the truck from the operator-platform 31 irrespective of the degree of elevation of the carriage 28 on the mast and this is an important feature of the invention.

Referring again to FIGURE 7 it will be appreciated that around the rising mast 23 there is a casing 85 which is also seen in FIGURE 6 and FIGURES 1 and 2. The casing 85 forms part of the structure of the rising carriage on the mast and, as can be seen in FIGURE 7, it allows room for the cable 61 between itself and the main support 23. The pulley 62 appears in chain lines in FIGURE 7 because it is located above the level of the section taken.

The ram which extends out of the ram cylinder 22 is secured by a nut 86 to a plate 87 which is shown in plan in FIGURE 7 although strictly speaking it is above the level of the section. The plate itself can be best seen in FIGURE 5 of the drawing and it is secured to the top end of the rising section of the mast. It carries two chain pulleys 88 each of which is shaped to carry two chains, the links of which are indicated diagrammatically at 89 in FIGURE 7 and one of which can be seen at 89 in FIGURE 2. The portions 89 of the chains which extend down the outside of the mast close within the exterior of the structure are secured to the rising carriage. The portions which extend down the interior close around the ram cylinder 22 are anchored to a fixed point, such as the top of a ram cylinder. Therefore when the ram is extended out of its cylinder and the rising mast is lifted the carriage on the mast is also lifted but at twice the speed of the rising section of the mast, in known manner.

One end of a safety cable 102 is connected to safety gear preventing the carriage from dropping in the event of breakage of the chain gear or its anchorages, which might allow the elevated carriage to descend precipitately. This mechanism is partly seen in plan in FIGURE 7 and partly appears in FIGURES 11, 12 and 13, hereinafter described.

The load carriage comprises an upright plate 90 (on which the fork arms 29 are mounted), which is spaced slightly forwardly of the extensible mast portion by means of a pair of rearwardly-extending side members 91 which straddle the extensible mast portion 24 and are provided with rollers 27 as already described.

The safety device comprises two pairs 92, 93 and 94, 95 of wedge members which are mounted behind the upright plate 90 of the carriage in the space between that surface and the extensible mast portion 24, one pair of wedge members being opposite the front flange of one of the channel members 24 of the extensible mast portion and the other pair of wedge members being opposite the front flange of the other channel member (see FIGURE 13). Each pair of wedge members comprises one member (93 or 95) which is fixed to the upright plate 90 and a second wedge member (92 or 94) which is below the first wedge member and is mounted on an arm (96 for wedge 92 and 97 for wedge 94) pivoted to the upright plate 90 so that it is movable upwardly and downwardly relative to the other wedge member of the pair. The wedge members 92 and 93 have complementary wedge surfaces and so have members 94 and 95 and the wedges 92 and 94 are movable between a first position in which the wedge surfaces are spaced from one another to permit free movement of the carriage on the extensible mast portion and a second position in which they are wedged between the wedge surfaces of the wedges 93, 95 and the face of the adjacent front flanges of the extensible mast members 24, the carriage being restrained against moving forwardly of the mast by its rollers 27 (FIGURE 7) bearing against the rear faces of the same front flanges. The carriage is thereby restrained against downward movement on the extensible mast portion when the wedges are engaged.

As can be seen from FIGURE 12 the arms 96, 97 are linked together by means of a compression spring 98 and abutments 99, 100 so that they move together into and out of their engaged positions. Movement into engaged position is opposed by means of a tension spring 101 fixed at one end to the upright plate 90 and connected at its other end to the arm 97.

A cable 102 is connected at one end to the arm 96 in such manner that upward movement of the cable would cause the wedge members 92, 94 to move to their wedged positions and this cable extends upwardly therefrom to pass round a pulley wheel 103 mounted on the upper end of the front of the extensible mast portion 24, with its axis extending lengthwise of the truck. From the pulley wheel 103, the cable extends downwardly and has its other end anchored to a fixed part of the truck at the base of the mast. In normal operation therefore, there is no relative movement between the cable and the chains, and the wedge members 92, 94 are in their disengaged positions so that the carriage can move freely on the extensible mast portion.

If the chains 89 break or come free from their anchorages on the carriage or the fixed mast members, however, the carriage will initially fall to a small extent but, as the cable is anchored, it causes the wedge members 92, 94 to move relative to the carriage into their wedged position thereby to restrain the carriage against falling further. It will be appreciated that when the carriage is so restrained, the weight of the carriage is borne completely by the friction forces resulting from the wedging action of the wedge members so that the cable is not subjected to a large strain.

In the use of this truck it is necessary that the operator should be safeguarded from falling when the truck is raised and that the operation of picking up pallets on the forks 29 should be easily accomplished. For the latter purpose the sliding gate 44 must be raised and this gate is connected by cables 110, running over pulleys 111 and a drum 112. There is also a winding gear comprising a crank handle 113 connected by a chain and sprockets to the spindle 114 of the drum 112 and by this means, the gate 44 can be raised and lowered. When a pallet has been picked up (it may be a pallet loaded with goods) the gate 44 can be lowered and the gates 45 can be opened so that the operator is free to move forward on to the pallet in order to handle the goods.

Fr loading a pallet when it is at ground level, it may be desirable for the side rails 42, 43 to be shifted out of the way. To this end, at one end of each rail it is pivoted as shown at 142, 143 to the upright 32. The two rails are connected by a link 144 and they can be swung up into the position shown on the far side of the truck as viewed in FIGURE 1. FIGURE 9 shows the construction in more detail and it will be observed that the lower rail 43 carries at the end remote from its pivot a projection 145 which, when the rail is lowered, engages between the two sides of a U-shaped bracket 146 secured to the upright 36. The upper rail 42 is slidably mounted on a lateral extension of its pivot 142 and also engages a bracket 147 on the upright 36 but in this case the projection 148 which enters the bracket is a spring bolt fastened on the end of the rail 42 which, when the rail is lowered home into the bracket shoots forward into a hole in the side of the frame member 36. The bolt is urged forward by a spring shown in dotted lines at 149 and it can be retracted by pulling the rail away from the frame until the bolt is clear. Brackets similar to the brackets 147 are provided near the top of the uprights 32 to retain the rails in their raised position. The hub of the rail 42 where it is pivoted at 142 is shaped as a cam to engage the operating member of an interlock switch 152 and the cam is formed so that the switch contact is broken except when the rail is lowered into the horizontal position. The interlock switch operates a device for preventing the platform being raised or lowered when the rails are in their open position.

FIGURE 10 indicates the construction of the swinging gates 41 and 45. The gate 41 is made of sheet metal and is hollow and is provided with a latch 153 which slides in the wall of the casing 63 in the side of the operator-platform and is operable by a latch handle 154. Pivoted on spring loaded hinges in the hollow portion of the gate 41 is the gate 45 and when the latch 153 is released to open the gate 41, the gate 45 automatically swings to close any access to the space in front of the mast, when a pallet is not located on the forks. It will be appreciated that there are two gates 41, (including the gates 45) one on each side of the platform and the latches 153 are so connected that when either one is released, both gates 45 are automatically caused to close if they are not already in the closed position.

In operating this truck, the operator is able to stand on the platform 31 and control the steering and propulsion of the truck, whether the carriage 28 is raised or lowered and he can thus guide the truck along narrow aisles in a store and also cause the carriage 28 to be raised or lowered, to the level of any goods-storing shelves on either side of the aisle.

If he is loading an order for mixed goods on to a pallet on the forks 29 he can position the truck to collect each item in turn and collect each item by moving off the platform 31 on to the pallet and reaching over the side-rails 42, 43 for the goods. When the pallet is fully loaded he can move the truck to a station where he can deposit the pallet, if desired directly on the floor of a road vehicle.

If he is unloading goods on to the shelves in the aisles the operations are reversed.

The safety devices and interlocks carried by the guard rails 42, 43 and by the end gate 44 and gates 45 and 41, prevent him from moving into positions where he could accidentally fall off the truck when the carriage is raised and the safety device shown in FIGURES 11–13 obviates risk from slipping when the carriage is raised, in the event of chain failure.

I claim:

1. A truck having in combination a wheeled body, a mast upstanding from the body which is narrow in relation to the width of the body, a carriage movable up and down the mast, an operator-platform on the carriage extending lengthwise of the body from the mast in one direction, pallet-supporting means on the carriage extending in the opposite direction, a guard surrounding the pallet-supporting means and, between the guard structure and the mast at least one opening the enable the operator to step beside the mast from the platform on to a pallet supported within the guard.

2. A truck as claimed in claim 1, wherein the body has straddle legs extending along each side which are wider than the pallet-supporting means and the latter are capable of descending to ground-level with a pallet on them between the legs when desired.

3. A truck as claimed in claim 2, wherein the pallet-supporting means consist of horizontal fork-arms carried on the carriage at a level below that of the operator-platform so that they can reach ground level without the platform fouling the truck body and wherein the guard where it extends across the end of the pallet-supporting forks consists of a gate which can be moved out of the way to permit loading a pallet on to the forks.

4. A truck as claimed in claim 1, wherein a gate is provided across the opening between the operator-platform and the guard structure.

5. A truck as claimed in claim 1, wherein the guard structure where it extends along the sides of the pallet-supporting means is made removable to permit ready loading or unloading of the pallet.

6. A truck as claimed in claim 5, wherein the guard structure at the sides consists of a pair of rails hinged to swing upwards and linked together and wherein an interlock is provided whereby the guard when swung upwardly prevents raising or lowering of the platform.

7. A truck as claimed in claim 1, wherein the mast consists of a primary mast having two channel-members disposed back-to-back with a narrow space between them and a secondary mast having a portion which extends on each side of the said channel-members and carries rollers engaging in the channels, the secondary mast also having channel members disposed back-to-back in front of the primary channels and wherein the carriage has a portion which extends on each side of the secondary mast and carries rollers engaging in the channels thereof.

8. A truck as claimed in claim 7, wherein the secondary mast is elevated by a ram located inside the primary mast and the carriage is elevated by a flexible member or members extending within the mast structure from a fixed point upwardly over pulley means at the top of the secondary mast and downwardly to the carriage.

9. A truck as claimed in claim 1, wherein the truck body carries at the end toward which the operator-platform extends, a casing containing driving and steering means for the truck and wherein the operator-platform carries controls for said driving and steering means which are connected to the means within the casing by a cable extending from the body of the truck over a pulley on the mast and down to the carriage and wherein the controls on the platform operate remote control devices in the casing for effecting control of the driving and steering means.

10. A truck as claimed in claim 9, wherein controls for raising and lowering the carriage are also mounted on the operator-platform and connected by cables to hydraulic pressure producing and releasing devices in the casing.

11. A truck as claimed in claim 1 further including supporting means for the carriage which includes a chain or cable connected to the carriage for raising and lowering it on the mast, characterized by the provision of a safety device for restraining downward movement of the carriage relative to the mast in the event of the said chain or cable breaking, which safety device comprises first and second wedge members which are mounted on the carriage for relative movement with respect to one another and which are movable relative to each other between a first position in which the wedge members permit free movement of the carriage along the mast and a second position in which the wedge members restrain the carriage against downward movement along the mast, and means adapted to cause relative movement of the wedge members from said first position to said second position in the event of breakage of the supporting means.

References Cited by the Examiner

UNITED STATES PATENTS

| | | | |
|---|---|---|---|
| 1,108,723 | 8/1914 | Dolph | 187—88 |
| 2,841,302 | 7/1958 | Reisman et al. | 214—653 |
| 2,897,920 | 8/1959 | Falter | 187—88 |
| 3,016,973 | 1/1962 | Williamson | 187—9 |
| 3,062,325 | 11/1962 | Quayle | 187—9 |
| 3,172,500 | 3/1965 | Dolphin | 187—9 |

EVON C. BLUNK, *Primary Examiner.*

ANDRES H. NIELSEN, *Examiner.*